(12) United States Patent
Liu et al.

(10) Patent No.: US 7,816,295 B2
(45) Date of Patent: Oct. 19, 2010

(54) HYDROTHERMALLY STABLE AG-ZEOLITE TRAPS FOR SMALL OLEFIN HYDROCARBON MOLECULES

(75) Inventors: Xinsheng Liu, Edison, NJ (US); Xinyi Wei, Princeton, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 0 days.

(21) Appl. No.: 12/133,465

(22) Filed: Jun. 5, 2008

(65) Prior Publication Data

US 2008/0253950 A1    Oct. 16, 2008

Related U.S. Application Data

(62) Division of application No. 11/606,817, filed on Nov. 30, 2006, now Pat. No. 7,419,647.

(60) Provisional application No. 60/741,336, filed on Dec. 1, 2005.

(51) Int. Cl.
*B01J 29/06* (2006.01)
(52) U.S. Cl. .................. 502/60; 502/87; 502/400; 502/407; 502/414; 502/515; 502/518
(58) Field of Classification Search .............. 502/60, 502/87, 400, 407, 414, 515, 518
See application file for complete search history.

(56) References Cited

U.S. PATENT DOCUMENTS

| 3,897,327 | A  | 7/1975  | Ward          |
| 4,429,176 | A  | 1/1984  | Chester et al.|
| 4,550,218 | A  | 10/1985 | Chu           |
| 4,812,223 | A  | 3/1989  | Hickey, Jr. et al. |
| 5,976,356 | A  | 11/1999 | Drake et al.  |
| 6,074,973 | A  | 6/2000  | Lampert et al.|
| 6,171,556 | B1 | 1/2001  | Burk et al.   |
| 6,307,117 | B1 | 10/2001 | Tsunoda et al.|
| 6,319,484 | B1 | 11/2001 | Shore et al.  |

FOREIGN PATENT DOCUMENTS

| EP | 909579 A1     | 4/1999 |
| EP | 1642641 A1    | 4/2006 |
| WO | WO2007/064808 | 6/2007 |

OTHER PUBLICATIONS

PCT International Search Report PCT/US2006/045871 mailed Apr. 19, 2007.

*Primary Examiner*—Elizabeth D Wood
(74) *Attorney, Agent, or Firm*—Bronwen M. Loeb; Drinker Biddle & Reath

(57) ABSTRACT

A hydrocarbon trap comprises an Ag-zeolite which is heated by a unique steaming regimen.

15 Claims, 3 Drawing Sheets

HYDROTHERMALLY STABLE AG-ZEOLITE TRAPS FOR SMALL OLEFIN HYDROCARBON MOLECULES

CROSS REFERENCE TO RELATED APPLICATIONS

This application is a divisional of U.S. Ser. No. 11/606,817 filed Nov. 30, 2006, now U.S. Pat. No. 7,419,647 issued Sep. 2, 2008, which claims the benefit under 35 U.S.C. 119(e) of provisional application U.S. Ser. No. 60/741,336 filed Dec. 1, 2005.

FIELD OF THE INVENTION

The present invention relates to a catalyzed hydrocarbon trap material and a method of making the same. More particularly, the invention relates to such material comprising zeolite having a silver component exchanged thereon to enhance the hydrocarbon-adsorbing properties. A novel steaming regimen enhances the stability of the Ag-zeolite.

BACKGROUND OF THE INVENTION

The treatment of internal combustion engine exhaust to convert noxious components such as hydrocarbons ("HC"), carbon monoxide ("CO") and nitrogen oxide ("$NO_x$") to innocuous components (water, carbon dioxide and nitrogen) is, of course, well known in the art. Such conversion is attained by contacting the engine exhaust with one or more catalysts, usually comprising an oxidation catalyst and a reduction catalyst, or a so-called three-way conversion catalyst, which has the capability of substantially simultaneously oxidizing HC and CO to water and carbon dioxide, and reducing $NO_x$ to nitrogen. Such catalysts often comprise a platinum group metal such as platinum, platinum plus rhodium or palladium dispersed on a refractory inorganic oxide support such as gamma alumina.

A persistent problem in meeting ever more stringent government regulations concerning the discharge of pollutants from engine exhaust is the fact that catalysts, especially oxidation catalysts, require an elevated temperature, usually above 200 or 250° C., in order to attain reasonably high conversion efficiencies. Therefore, during an initial start or other period of engine operation while the engine is cold, referred to as a "cold operation period", conversion of pollutants, especially hydrocarbons, is carried out with a low efficiency, if at all. Thus, a very substantial proportion of the total oxidizable pollutants, largely comprising hydrocarbons, discharged to the atmosphere during a given period of operation, is discharged during the cold operation period. In order to ameliorate this problem, the art is aware of the expedient of using, in conjunction with the catalyst, a hydrocarbon trap material, such as certain zeolites, which will adsorb hydrocarbons at a low temperature at which the oxidation catalyst is relatively ineffective, and desorb the hydrocarbons only at a more elevated temperature, at which conversion efficiency of the oxidation catalyst is higher than during the cold operation period.

One difficulty with such prior art expedients is that such zeolite materials tend to begin desorbing hydrocarbons, and thus releasing the hydrocarbon to the catalyst, before the catalyst is hot enough to attain acceptably high conversion efficiencies. That is, the prior art inclusion of zeolites, while improving the situation by adsorbing hydrocarbons for a period, commence the desorption too soon after the cold operation period, thereby releasing the hydrocarbons before the catalyst is sufficiently heated, so that only a limited benefit is attained. It would therefore be desirable to have a composition which adsorbs or otherwise traps and retains the hydrocarbons and does not release the hydrocarbons until release temperatures higher than those heretofore attainable are reached by the catalyst used to oxidize the hydrocarbons.

Commonly assigned U.S. Pat. No. 6,171,556, issued Jan. 9, 2001 teaches a method of treating an engine exhaust gas stream containing hydrocarbons and other pollutants at least during a cold-start period of operation. The invention therein provides that the adsorbent material may comprise a molecular sieve material, for example, a molecular sieve material selected from the group consisting of faujasite, chabazite, silicalite, zeolite X, zeolite Y, ultrastable zeolite Y, offretite, and Beta zeolites. In particular, ion-exchanged Beta zeolites may be used, such as Fe/Beta zeolite, or preferably, H/Beta zeolite. The zeolites, preferably Beta zeolites may have a silica/alumina molar ratio of from at least about 25/1, with useful ranges of from about 25/1 to 1000/1. U.S. Pat. No. 6,171,556 is herein incorporated by reference in its entirety.

Preferred zeolites, as discussed in U.S. Pat. No. 6,171,556 include ZSM, Y and Beta zeolites, with Beta zeolites particularly preferred. Most preferably, the adsorbent material is a zeolite that has been treated to remove Bronsted acid sites from the zeolite and has a relative Bronsted acidity, of less than 1.0, preferably less than 0.5. This can be accomplished by leaching the zeolite with an organic or inorganic acid. The zeolite alternatively or additionally can be treated with steam at from 350 to 900° C. with the steam temperature increasing at from 100 to 600° C. degrees per hour. Steam treatment has been found to reduce the relative Bronsted acidity, and result in an increase in the durability of the zeolite when used in hydrocarbon adsorption applications in exhaust gas streams. It has been found that by using such zeolites, the formation of coke during engine testing has been significantly reduced. The material disclosed in U.S. Pat. No. 6,171,556 has been found to effectively adsorb large hydrocarbon molecules, e.g. $\geq C_4$.

Another difficulty with prior art expedients in which the zeolites are ion-exchanged with cations such as silver, copper or other metals, is the perceived need to segregate catalytic components, such as platinum group metals dispersed on an inorganic oxide support material, from metal ions such as silver, which are ion-exchanged or otherwise dispersed on the zeolite particles. This requires additional manufacturing steps and segregated operations in which impregnation of the oxide supports with catalytic metals such as platinum, or platinum and rhodium, is segregated from operations in which metal cations are ion-exchanged into the zeolites. The ion-exchanged zeolite particles and the separately prepared platinum group metal-impregnated support material particles are then admixed with each other, or disposed on separate portions of a substrate, in order to provide the finished hydrocarbon trap/catalyst material.

In commonly assigned U.S. Pat. No. 6,074,973, issued Jun. 13, 2000, there is disclosed a catalyzed hydrocarbon trap material in which silver and palladium are both dispersed onto zeolite particles and onto refractory metal oxide particles. In one embodiment of the invention, the major portion of the silver is dispersed onto the zeolite particles and the major portion of the palladium is dispersed onto the refractory metal oxide particles, with only a minor portion of the silver dispersed onto the metal oxide particles and only a minor portion of the palladium dispersed onto the zeolite particles. The catalyzed hydrocarbon trap material of the invention is made by a method in which the refractory metal oxide particles and the zeolite particles, together with a soluble palladium component and a soluble silver component dispersed or dissolved together in water, are all combined to effectuate the impregnation of the palladium and silver components into the zeolite and metal oxide particles. The resulting slurry may then be deposited on a suitable substrate, such as a honeycomb-type substrate, and fired at an elevated temperature to provide the catalyzed hydrocarbon trap material. It has been found that Ag-ZSM-5 materials formed by the process described in U.S. Pat. No. 6,074,973 can adsorb small hydrocarbon molecules. The entire content of U.S. Pat. No. 6,074,973 is herein incorporated by reference.

In accordance with U.S. Pat. No. 6,074,973 there is provided a method of making a catalyzed hydrocarbon trap material comprising the following steps. Water, a water-soluble silver component, a water-soluble palladium component, particulate refractory inorganic oxide solids, and particulate zeolite solids having a Si to Al atomic ratio of at least 10 and a pore aperture diameter of at least 4 Angstroms are combined to form an aqueous slurry of the solids. The zeolites may comprise one or more of ZSM-5, Beta, Y, MCM-22 and EU-1 zeolites, e.g., one or more of ZSM-5, Beta and Y zeolites. In any case, the resulting slurry is maintained for a time sufficient to disperse at least some of the palladium component and at least some of the silver component onto each of the inorganic oxide solids and the zeolite solids. Optionally, the loading of the palladium component may be greater on the inorganic oxide solids than on the zeolite solids, and the loading of the silver component may be greater on the zeolite solids than on the inorganic oxide solids. The slurry is then dewatered to provide dewatered solids, and the dewatered solids are heated, e.g., in air at a temperature of at least about 500° C. for at least the time required to decompose the counter ions, i.e., the anions such as nitrate or acetate ions, of the metal salts used in the preparation, and to provide the catalyzed hydrocarbon trap material as a dried mixture of solids.

NGK Insulators' Japanese patent document (Kokai) 8-10566 (1996) was published on Jan. 16, 1996 based on Japanese Patent Application 6-153650, filed on Jul. 5, 1994 and entitled "A Catalyst-Adsorbent For Purification Of Exhaust Gases And An Exhaust Gas Purification Method." The Abstract of this document, below referred to as "the '650 Application", discloses a catalyst-adsorbent in which a catalyst material effective for decreasing CO, HC and $NO_x$ in internal combustion engine exhaust is combined with an adsorbent material that traps hydrocarbon during cold discharge start-ups. The adsorbent material of the '650 Application is comprised of particles of primarily zeolite, preferably zeolite having a silica-to-alumina ratio of 40 or more; these include ZSM-5 and Beta zeolites. The zeolite adsorbent may optionally have metal ions dispersed therein, the presence of ions of high electro-negativity being said to increase the HC adsorptive capacity. Such ions include silver, palladium, platinum, gold, nickel, copper, zinc, cobalt, iron, manganese, vanadium, titanium, and aluminum. The '650 Application discloses that metal cations may be applied to the zeolite by either ion exchange or immersion methods. The presence in the zeolite of at least one ion of elements of Group IB of the Periodic Table (copper, silver, gold) is said in the '650 Application to manifest a high adsorptive capacity for hydrocarbons even in the presence of water. Copper and silver are stated to be preferable and silver ions, which are specified in some of the examples of the '650 Application, exchanged into the zeolite are said to be particularly desirable for adsorbing HC at higher temperatures. It is stated that the ion content of the zeolite should be greater than 20%, and preferably greater than 40%, relative to the aluminum atoms in the zeolite.

Example 95 of the '650 Application shows palladium on ceria-stabilized alumina in a first coating layer and silver- and copper-exchanged ZSM-5 in a second coating layer. Table 6 shows ZSM-5 zeolites exchanged only with silver. The '650 Application discloses that in order to improve low-temperature ignition characteristics to the maximum, it is desirable to form a palladium surface coat layer in which palladium is the only noble metal carried on the particles. The '650 Application further discloses the desirability of forming a first coating on a substrate comprised of the adsorbent zeolite material, over which a second coating comprised of a catalyst material containing only palladium catalyst particles is placed. This is stated to provide excellent durability and low-temperature ignition characteristics of the catalyzed trap material.

Development of a hydrocarbon trap for trapping small hydrocarbon molecules is a challenge. Over the years, many materials have been tested for use as hydrocarbon traps for cold start applications. The materials have to be water-resistant, hydrothermally stable and have the right temperature range for adsorption and desorption of hydrocarbons.

SUMMARY OF THE INVENTION

In accordance with the present invention, a method of making a hydrothermally stable Ag-zeolite hydrocarbon trap for use in cold start applications is provided. The method, in general, involves exchanging or impregnating the zeolite with silver cations, followed by a high temperature steaming. Optionally, a first mild steaming of the zeolite can take place prior to the silver inclusion into the zeolite. The Ag-zeolite formed by the method of the present invention has improved hydrothermal stability and is effective for trapping hydrocarbon molecules, including small molecules.

A BRIEF DESCRIPTION OF THE DRAWINGS

DETAILED DESCRIPTION OF THE INVENTION

Figure 1:
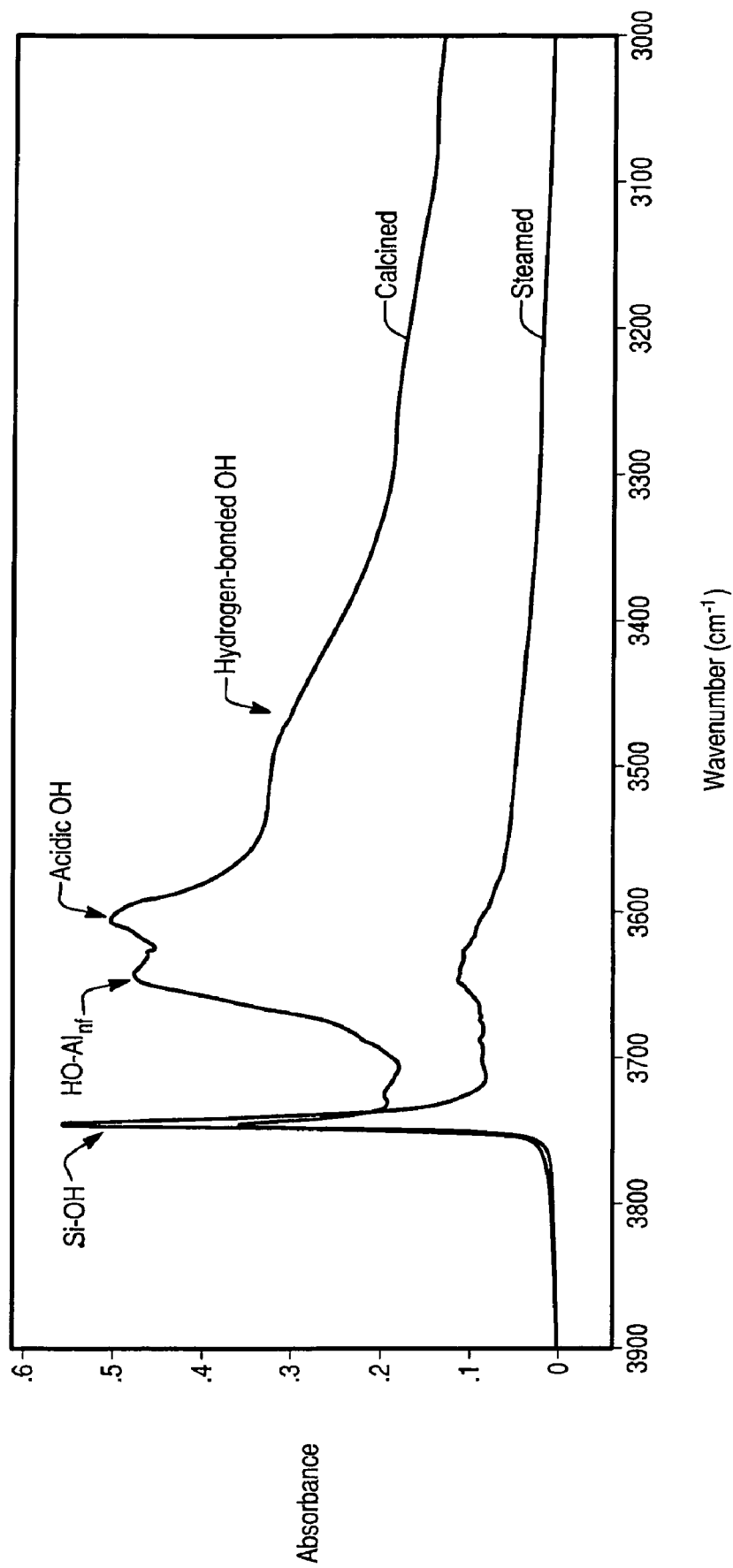
FIG. 1 is a pair of plots comparing the characterizations by IR of an Ag-zeolite formed with the novel steam regimen of this invention and an Ag-zeolite formed by a different process.

The Ag-zeolites and method of making same in accordance with this invention are particularly suited for minimizing noxious emissions from an engine exhaust gas stream during the cold-start operation of an internal combustion engine. Such engines are fueled by hydrocarbonaceous fuels and are known to emit a variety of noxious pollutants in their exhaust gases. The hydrocarbons in such fuel generally comprise gasoline or diesel fuel, but sometimes comprise alcohols, including ethanol and methanol. Mixtures of these above-mentioned fuels can also be used. Thus, the exhaust gas stream from such an engine contains pollutants such as hydrocarbons, $NO_x$ and carbon monoxide, which must be removed prior to discharging the exhaust gas stream into the atmosphere to comply with State and/or Federal Government exhaust emission standards. The problem of controlling the emission of these pollutants, particularly hydrocarbons, is most acute during the cold-start period of engine operation, during which the engine may be cold, (i.e., below standard operating temperature) and during which any environmental catalyst used to convert the pollutants to innocuous substances may be below its operating temperature. The present invention provides a hydrocarbon adsorbent and method of making and using same for reducing the emission of unburned hydrocarbons during and after the cold-start period of engine operation The zeolites that can be used as the hydrocarbon trap material of this invention are not particularly limited and can include many natural and synthethic aluminosilicate molecular sieves. Non-limiting examples of natural molecular sieves include faujasites, clinoptilolites, mordenites, chabazites, and ferrierites. Synthetic zeolites, a class of molecular sieves which can be used include, but are not limited to: zeolite X, zeolite Y, ultra stable zeolite Y, ZSM-5, offertite, beta-zeolite and the like. Generally, the molecular sieve materials, which are used have an average micro-pore diameter of at least about 3.5 angstroms. Typically, the aluminosilicate molecular sieves will have silica to alumina ratios of less than 25/1 and, more particularly, the aluminosilicate sieves of this invention will have silica to alumina mole ratios of less than 20 after the steam regimen of the present invention which is described more fully below. The silica to alumina ratio in the framework of the zeolites of this invention is high enough to result in low coke formation in the adsorbent material when trapping the hydrocarbons and is sufficiently low so as to provide an effective number of exchange sites for silver to improve hydrocarbon trapping. The silver-exchanged zeolites of this invention after the steam treatment also show improved hydrothermal stability during operation.

The silver-zeolites of the present invention are formed by the following process which involves a silver ion exchange or silver salt impregnation followed by a steaming at an elevated temperature. Optionally, a first mild steaming prior to silver exchange or impregnation can take place. In accordance with this invention, the first steaming is done at relatively mild conditions of temperature ranging from about 375 to less than 600° C. and further exemplified by 400 to 550° C. In general, the steam concentration will vary from about 5 to 50%, with steam concentrations of 5 to 30% and about 10% being exemplified, with the balance being air found useful. The duration of the steam treatment is efficient to treat the zeolite and is typically from about 0.5 to 6 hours and preferably from about 1 to 4 hours. The steam treatment does not significantly increase the silica to alumina ratio. However, this mild steam treatment is believed to reduce the acidity of the zeolite by removing at least some of the alumina from the framework of the zeolite. It is important, unlike the prior art that the zeolite not be grossly dealuminated so as to maintain a sufficient exchange capacity within the zeolite and provide for effective loading of the zeolite with an appropriate level of silver during ion exchange. It is preferred that the zeolite prior to the first mild steaming treatment be exchanged with $H^+$ or $NH_4^+$ cations so as to reduce the sodium content of the zeolite.

Subsequent to mild steaming, the zeolite is then exchanged with silver cations by methods well known in the art. In general, the steamed zeolite in aqueous slurry is contacted with a water-soluble silver salt such as silver nitrate, acetate, etc. for a time sufficient to load to the zeolite with the appropriate level of silver. In general, the silver content of the exchanged zeolite will comprise from about 1 to about 15 wt % Ag, based on the total weight of the silver plus the trap zeolite. Exemplified also are silver levels of about 4 to about 8% wt. as Ag. The exchanging of silver into the zeolite can be conducted in one step or several steps in which after each exchange, the silver-exchanged zeolite solid is separated from the liquid by filtration, the filtered cake washed with deionized water and the wet cake dried at temperatures typically ranging from about 80 to 120° C.

In accordance with this invention, subsequent to the silver exchange of the mildly steamed zeolite, the silver-exchanged zeolite is then steamed again at a temperature higher than that used during the mild steaming procedure discussed above. In general, in this second steaming, the silver-exchanged zeolite is treated at a temperature of from about 600 to 900° C., preferably from about 700 to 850° C. A steam temperature of about 800° C. is also exemplified. The steam concentration will be from about 5 to about 100%, with steam concentrations of 5 to 50% preferred, and a 10% steam concentration exemplified, with the balance of being air. The steaming is preferably conducted at atmospheric pressure. The duration of the steam treatment will generally range from about 0.5 to 16 hours, with about 1 to 8 hours and about 4 hours being exemplified. In as much as the zeolite has been exchanged with the silver prior to the second steam treatment, this relatively harsh steam treatment does not in any significant manner increase the silica to alumina ratio. It is, however, believed to reduce the acidity of the zeolite by removing at least some of the aluminum which does not contain exchanged silver from the framework of the zeolite. This second steam treatment has been found to improve the hydrothermal stability of the zeolite. A zeolite treated in accordance with the process of this invention is characterized by IR in FIG. 1 as will be more fully discussed below in the following examples.

The same process can be simplified by omitting the first mild steaming and going directly to ion exchange with silver followed by high temperature steaming. Moreover, the Ag+ ion exchange procedure can be replaced by Ag+ salt solution impregnation or incipient wetness followed by the high temperature steaming.

The silver-containing zeolites of this invention can be combined with an oxidation catalyst containing one or more of platinum, palladium and rhodium. In general, the silver-containing zeolite and the oxidation catalyst can be separately prepared and may be used either by having particles of each intimately mixed in a single coating on a substrate or by having separate zeolite and catalyst layers coated one over the other. In addition, a mixture of refractory inorganic oxide support and a particulate zeolite may be treated together with silver and palladium as described in aforementioned commonly assigned U.S. Pat. No. 6,074,973. Further, it is possible to utilize the silver-containing zeolite of this invention with other known hydrocarbon adsorbents such as described in commonly assigned U.S. Pat. No. 6,171,556. The hydrocarbon adsorbents can be intimately mixed or applied as separate layers on a support substrate.

The hydrocarbon adsorbent material of the present invention is a composition which comprises a molecular sieve, preferably an Ag-zeolite steam treated as recited above and a binder also referred to as a washcoat binder. Washcoat binders typical for use in the formulation of slurries include but are not restricted to the following: sols of alumina, silica, ceria and zirconia; inorganic and organic salts and hydrolysis products thereof of aluminum, silicon, cerium and zirconium such as nitrates, nitrites, halides, sulfates and acetates; hydroxides of aluminum, silicon, cerium, zirconium, and mixtures of all of the above components. Also useful as binders are organic silicates which are hydrolyzable to silica include tetraethyl orthosilicates.

The relative proportions of Ag-zeolite and binder can range from about 1 to 20 percent by weight and preferably from about 5 to about 15 weight percent. A preferred composite comprises about 90 weight percent Ag-zeolite and about 10 weight percent of a silica sol. Preferably, the silica sol has substantially no alumina.

The adsorbent material may be deposited onto a solid monolithic carrier by methods known in the art. It is usually most convenient to apply the adsorbent as a thin film or coating deposited on an inert carrier material which provides the structural support for the adsorbent. The inert carrier material can be any refractory material such as ceramic or metallic materials. Alternatively, as is known in the art, the adsorbent may be provided in the form of pellets or beads disposed in a flow-through canister to provide an adsorbent bed through which the exhaust gases flow. In still other embodiments, the adsorbent material may be extruded or otherwise fabricated into monolithic form and disposed within the exhaust gas stream.

The amount of adsorbent components of the composition can be varied based on factors including the specific hydrocarbons to be adsorbed, the specific zeolite and binder combination and concentrations, the conditions of the stream containing the hydrocarbons and the like. Typically, an adsorbent composition is in an aqueous slurry form having 5 to 50, preferably 10 to 40 weight percent solids, for use to coat a monolith, such as a honeycomb. The resultant monolith preferably is coated with the adsorbent composition and preferably has from 0.3 to 3.0 g/in.$^3$ and preferably 0.5 to 2.5 g/in.$^3$ of coating based on the amount of zeolite adsorber compound.

Generally, the adsorbent zone should not be positioned so close to the engine outlet that the adsorbent zone is subjected to exhaust gas temperatures high enough to desorb hydrocarbons trapped therein prematurely, i.e., before the catalyst downstream of the absorbent zone attains an effective operating temperature. For example, if a hydrocarbon trap is placed in the underfloor position of a conventional automotive exhaust system, the hydrocarbons may only be effectively adsorbed for only a short period of time, and desorbed well before the downstream oxidation catalyst is at the desired temperature for reaction. However, a trap placed in the tail pipe will retain hydrocarbons effectively. Of course, it is necessary to position the trap upstream of a hydrocarbon conversion catalyst so that when the hydrocarbons are finally desorbed, they are converted to innocuous substances. Accordingly, the adsorbent zone should preferably be positioned at a location in the engine exhaust system which is upstream of a hydrocarbon conversion catalyst but which is also removed as far as is feasible from the engine so that the exhaust gases may cool somewhat before entering the adsorbent zone. By so positioning the adsorbent zone and by providing heat exchange between first and second catalyst zones as described herein, the retention of adsorbed hydrocarbons by the adsorbent during initial cold-start operation is prolonged.

Figure 3:
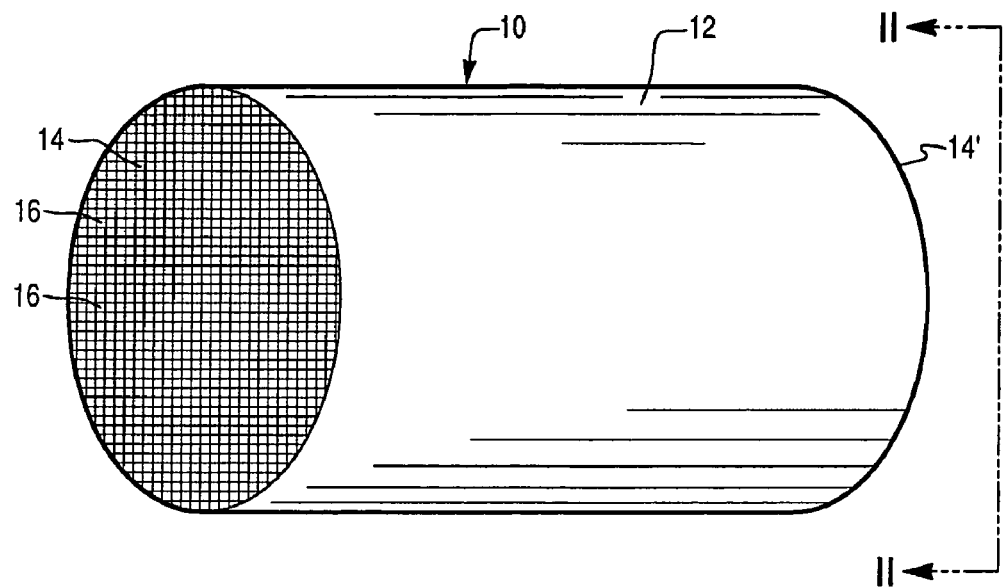
FIG. 3 is a schematic perspective view of a hydrocarbon trap member in accordance with one embodiment of the present invention.
Figure 4:
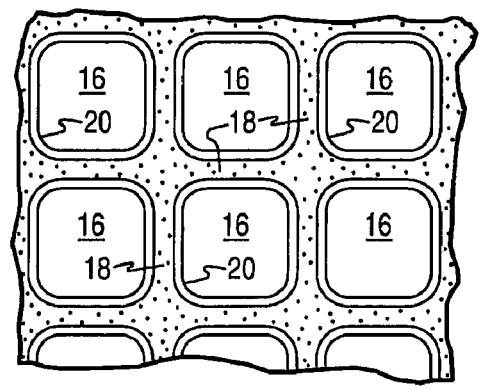
FIG. 4 is a schematic end view in elevation, greatly enlarged relative to FIG. 3, of several of the gas flow channels of the member of FIG. 3.

FIG. 3 shows a catalyzed hydrocarbon trap member 10 having an outer surface 12 and a plurality of fine, parallel gas flow channels 16 extending from and through inlet face 14 to and through outlet face 14'. As seen in FIG. 4, the gas flow channels 16 are defined by a plurality of walls 18 which have on the surfaces thereof defining the channels 16 a thin, dried and calcined washcoat 20 comprising the catalyzed hydrocarbon trap material of the present invention. Washcoat 20 is thus comprised of a silver-containing zeolite, e.g., ZSM-5 and/or Beta, optionally containing some palladium dispersed on a high surface area support, e.g., gamma alumina. In use, the catalyzed trap member 10 is placed within a suitable container, usually stainless steel, and interposed in the exhaust line of an internal combustion engine in a manner well known to those skilled in the art, so that the exhaust flows through the channels 16 from inlet face 14 to outlet face 14' of trap member 10.

Figure 5:
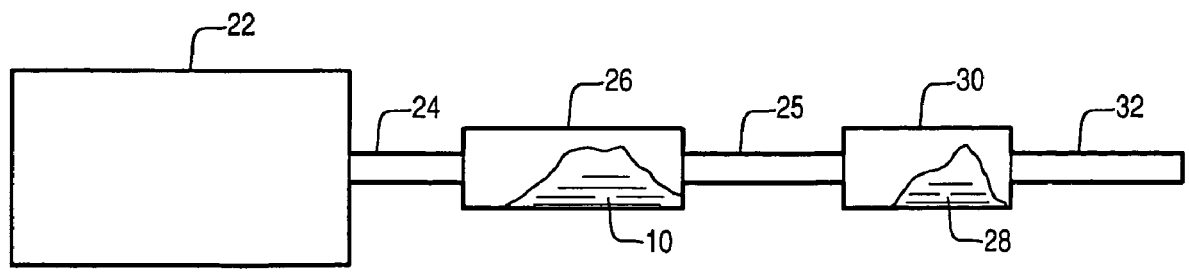
FIG. 5 is a schematic view of a hydrocarbon trap member in accordance with an embodiment of the present invention employed in the exhaust line of an internal combustion engine.

FIG. 5 schematically shows a typical use environment of member 10 wherein an internal combustion engine such as the illustrated gasoline-fueled engine 22 has an exhaust pipe 24. The exhaust discharged directly from engine 22 flows through the first section of exhaust pipe 24 to trap member 10, which is contained within a stainless steel canister 26 interposed in the flow path of exhaust pipe 24. The exhaust flows through the gas flow channels 16 (FIGS. 3 and 4) of trap member 10 in contact with washcoat 20 (FIG. 4) for treatment as described above. The exhaust discharged from trap member 10 is discharged to the second section of exhaust pipe 25 and directed to catalyst member 28. Catalyst member 28 may comprise any known or suitable oxidation or three-way conversion catalyst comprising a catalytic washcoat dispersed on a monolith similar to that of trap member 10. Thus, the catalytic material of catalyst member 28 is coated onto the walls defining the gas flow passages of catalyst member 28, which is encased within a stainless steel canister 30 in the known manner. The exhaust from catalyst member 28 is discharged to the atmosphere.

While the invention has been described with reference to particular embodiments thereof, it will be appreciated that upon a reading and understanding of the foregoing, alterations to the disclosed embodiments will occur to those skilled in the art and it is intended to include all such alterations within the scope of the appended claims.

Example 1

30 grams of the following zeolites in $NH_4^+$ form including: Ferrierite, mordenite, ZSM-5, and Beta, were steamed at 500° C. for 4 hours with 10% steam in air. 10 grams of the steamed zeolite samples were ion exchanged with silver according to the procedure as set forth below in Example 2.

Example 2

17 grams of Ag nitrate were dissolved in 500 ml of de-ionized water in a breaker under stirring at room temperature. After a clear solution was obtained, 23 grams of the $NH_4$-formed zeolite powder of Example 1 were slowly added to the silver nitrate solution. The suspension was stirred at room temperature overnight (or for 5 h at room temperature). The stirring was stopped to allow the solids to settle. The top supernatant was poured off and the solids separated from the liquid by filtration.

The filter cake was washed with de-ionized water three times (200 ml water each time). The wet cake was dried in an oven at 100° C. Each zeolite sample contained 4-5 wt % Ag.

Example 3

2 grams of each of the Ag+ ion exchanged zeolites were steamed at 800° C. for 4 hours under 10% steam in air.

Example 4

A ferrierite sample as formed in Examples 1-3 (8.4% Ag) was characterized by IR and compared to the IR characterization of a silver-exchanged ferrierite (8.4% Ag) that was not steamed, but calcined in air for 4 hours at a temperature of 400° C. The comparative sample was exchanged twice with Ag$^+$ using the procedure of Example 2 prior to calcination. The comparison is shown in FIG. 1. As can be seen, the sample steamed in accordance with this invention, had a reduced amount of acid sites.

Example 5

Figure 2:
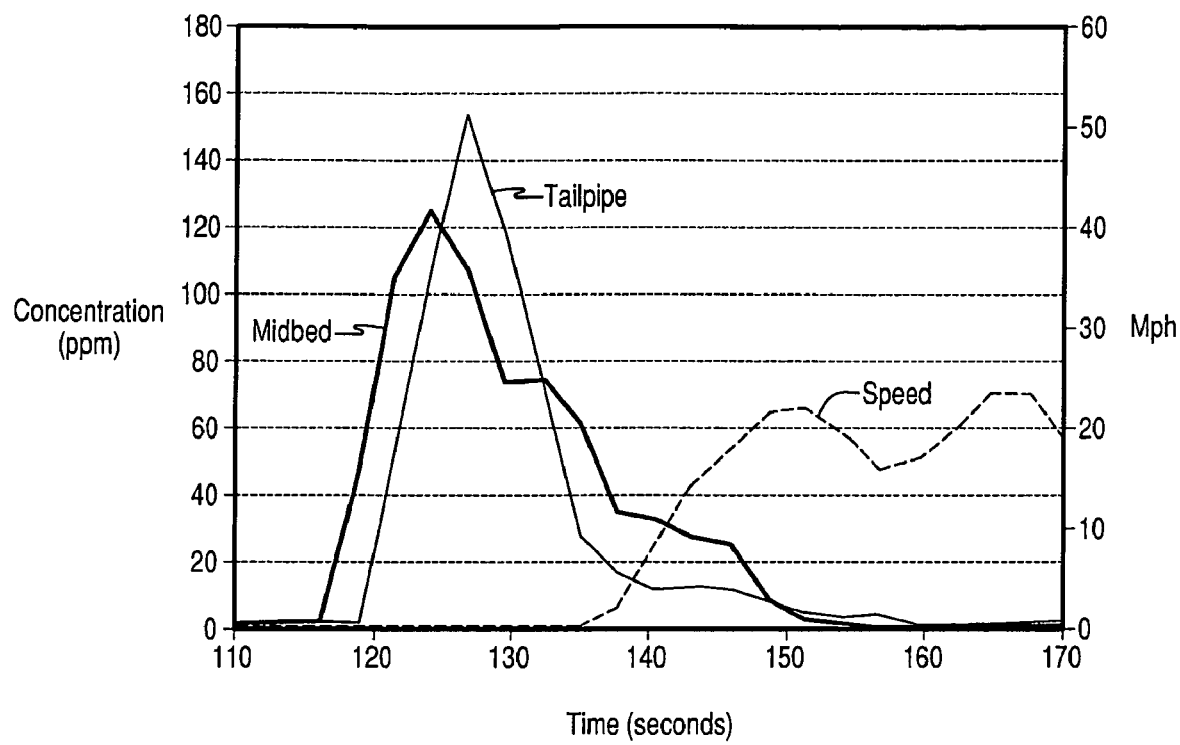
FIGS. 2 and 2A are graphic comparisons of ethylene adsorption, respectively, with a prior art hydrocarbon trap and with the use of the silver-zeolite formed by the method of this invention.
Figure 2A:
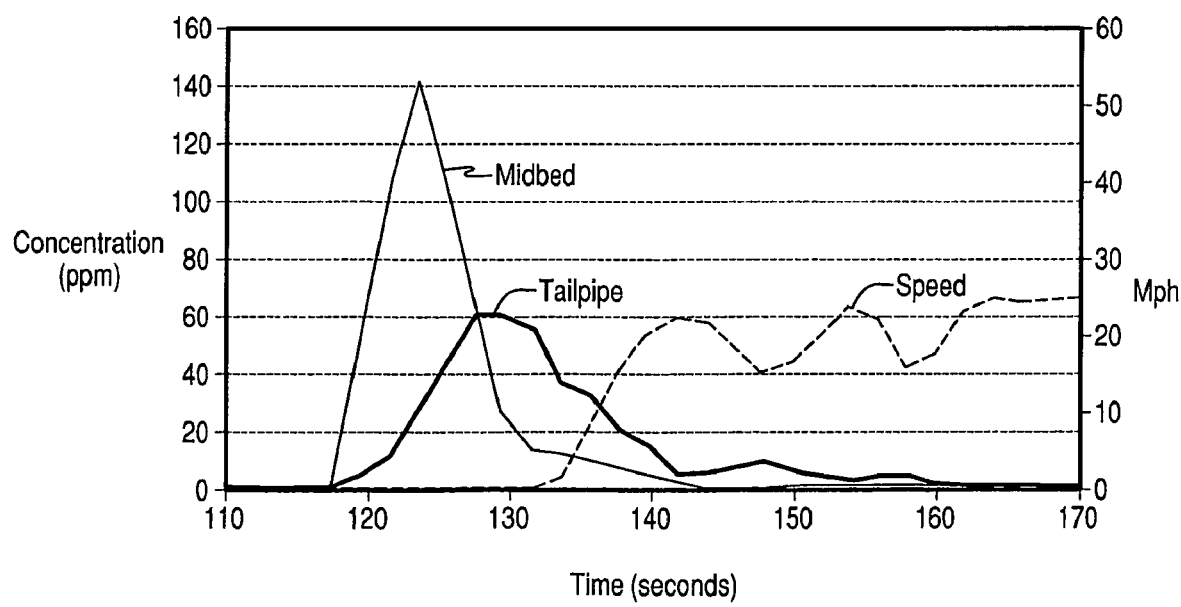

FIG. 2 and FIG. 2A compares a beta zeolite material vs Ag-exchanged Ferrierite in trapping ethylene during cold-start period of FTP 75 (Federal Test Protocol 75). In both FIGS. 2 and 2A, the X axis is run time (seconds), the left Y axis is ethylene concentration (ppm), and the right Y axis is the vehicle speed (mph). The HC adsorbent in FIG. 2. consists solely of beta zeolite (Si/Al=300) at a loading of 2 g/in$^3$, whereas the HC adsorbent in FIG. 2A consists of a beta zeolite bottom layer and an Ag-Ferririte (formed in accordance with the invention) top layer at equal loading (1 g/in$^3$). In both cases, a Pd layer and a Rh layer were coated on top of the HC adsorbent layer to complete the combocat design. FIG. 2. and FIG. 2A share the same Pd and Rh layers. The two catalysts were aged alone (without close-couple catalyst) at 800° C./50 hr under a fuel cut engine condition (25 sec. at lambda 1, 5 sec. fuel cut). The adsorbents were then evaluated for FTP 75 at the under floor position with an upstream close-couple catalyst. Mass spec data were collected at the mid-bed (inlet to HC trap) and tailpipe position on separate runs to compare the adsorption characteristics. In FIG. 2 which represents the HC trap layer containing beta zeolite material only (no Ag trapping center), the midbed and tailpipe showed similar ethylene absorption profiles, indicating no ethylene adsorption by the beta zeolite (the two curves would overlap completely if the midbed and tailpipe data were collected on the same run). In FIG. 2A, which represents the HC trap layer containing an additional layer of Ag-Ferrierite, significant ethylene absorption was observed. This corroborates the high trapping capability of Ag-Ferrierite after hydrothermal aging.

The invention claimed is:

1. A method of making a hydrothermally stable zeolite hydrocarbon trap comprising exchanging or impregnating a zeolite with cations consisting of silver cations to form a silver zeolite and subsequently steaming the silver zeolite at a high temperature of at least 600° C., absent a calcination step preceding said steaming step.

2. The method of claim 1, wherein said zeolite is a natural or synthetic zeolite having an average pore diameter of at least 3.5 angstroms.

3. The method of claim 1, wherein said zeolite after steaming has a silica to alumina mole ratio of less than 25/1.

4. The method of claim 1, wherein said zeolite prior to silver exchange or impregnation is steamed at mild steaming conditions of temperature of less than 600° C.

5. The method of claim 4, wherein said mild steaming temperature is from 400-550° C.

6. The method of claim 1, wherein said high temperature steam treatment is conducted at a temperature from about 600 to 900° C.

7. The method of claim 6, wherein said high temperature steam treatment is conducted at a temperature from about 700 to 850° C.

8. The method of claim 1, wherein said zeolite exchanged with silver cations is in the acid or ammonium form.

9. The method of claim 1, wherein said silver zeolite comprises from about 1 to about 15 wt % silver.

10. The method of claim 1, wherein said silver zeolite comprises from about 4 to about 8 wt % silver.

11. A hydrocarbon trap material formed by the method of claim 1.

12. The hydrocarbon trap material of claim 11, wherein said zeolite after steaming has a silica to alumina mole ratio of less than 25/1.

13. The hydrocarbon trap material of claim 11, wherein said silver zeolite comprises from about 1 to about 15 wt % silver.

14. The hydrocarbon trap material of claim 11, wherein said silver zeolite comprises from about 4 to about 8 wt % silver.

15. The hydrocarbon trap material of claim 11, wherein said hydrocarbon trap material is coated within channels of a flow-through monolithic carrier.

* * * * *